3,445,290
SILVER AND COPPER THIOCYANATE
PRIMARY CELLS
William E. Elliott, Elm Grove, and James R. Huff, Milwaukee, Wis., assignor to Globe Union Inc., Milwaukee, Wis., a corporation of Delaware
No Drawing. Filed Dec. 12, 1966, Ser. No. 600,723
Int. Cl. H01m 17/02
U.S. Cl. 136—83         10 Claims

ABSTRACT OF THE DISCLOSURE

Electrochemical primary cells using solid silver or copper thiocyanate cathodes and a nonaqueous electrolyte system including an organic electrolyte solvent and an electrolyte solute compatible with the cathodes and anodes of the cells. The anodes are solid alkali or alkaline earth metals such as lithium, potassium, sodium, calcium or magnesium.

---

This invention relates to primary electrochemical cells employing silver thiocyanate or copper thiocyanate electrodes, and more particularly to primary cells employing silver thiocyanate or copper thiocyanate cathodes in compatible nonaqueous electrolyte systems.

The desirability of having primary cells, which are operable under low temperature conditions, have a flat discharge curve or characteristic, have relatively low temperature coefficients, and provide a high energy weight output ratio, is well known, which desiderata comprise the general objects of this invention.

It can readily be understood that many aqueous electrolyte systems are particularly vulnerable to low temperature operations and therefore cannot be considered for reliable efficient performance under operating conditions which are expected to be substantially below ordinary freezing temperatures.

The efficiency of electrochemical cells is especially known to drop off considerably with temperature reduction. This phenomenon of change of efficiency with temperature is also known as temperature coefficient. It is also important in considering the overall aspects of a primary cell system. The primary cells of the present invention are those which characteristically have a low temperature coefficient.

To achieve high operating voltage in primary cells it is necessary to consider those anodes which typically produce high anode voltages and which have relatively low equivalent weights so as to produce a desirable combination of high energy to weight ratios and therefore achieve high output of energy for a given weight of material.

In the present invention the use of alkali metal and alkaline earth metal anodes in a nonaqueous system and in conjunction with a silver or copper thiocyanate cathode produces a primary cell which combines relatively low cost, available materials into a cell unit which has a high energy per pound output, utilizes a nonaqueous electrolyte system, and has a relatively low temperature coefficient.

Accordingly, the primary electrochemical cells of this invention comprise a solid silver or copper thiocyanate cathode, a compatible nonaqueous electrolyte and a compatible anode.

The silver or copper thiocyanate cathode is composed generally of solid or granular silver or copper thiocyanate which preferably is fixed to a nonreacting conducting support member such as a metal matrix. One convenient procedure is to compress the silver or copper thiocyanate with a binder on the metal matrix. In a preferred embodiment of this invention the metal matrix has been formed of silver, copper, nickel or any conductive material.

As indicated in the foregoing, the anode may be a member of the alkali and alkaline earth metals of which lithium, calcium, magnesium, sodium and potassium are preferred, and lithium and calcium are the most preferred members.

A lithium anode in particular is considered as an especially useful and preferred embodiment, since it has both a low equivalent weight and is readily available from commercial sources.

The electrolyte systems contemplated in this invention comprise an electrolyte salt and a nonaqueous organic electrolyte solvent, the latter characterized further in that the solvent is essentially inert to the action of alkali metal and alkaline earth metals, and does not contain active hydrogen atoms or other functional groups which are susceptible to reaction with the metals herein described as anode materials, or the silver and copper thiocyanate cathodes.

Further characteristics of the nonaqueous organic electrolyte solvent material are that it should be relatively fluid and mobile at operating temperatures and be sufficiently polar to dissolve the electrolyte salt. The organic solvent material component of the electrolyte should furthermore be relatively nonhygroscopic.

A preferred class of solvents are the N-nitrosodi-substituted amines of the general formula

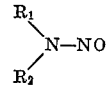

wherein $R_1$ and $R_2$ are selected from the group consisting of alkyl groups containing from 1 to 4 carbon atoms, and may be the same or different. Exemplary of these solvents are N-nitrosodimethylamine which is a particularly preferred embodiment of electrolyte solvent, N-nitrosodiethylamine, N-nitrosodipropylamine and N-nitrosodibutylamine. Other organic solvents useful in the electrolyte systems are acetonitrile, propylene carbonate, liquid mixtures of ethylene and propylene carbonate, γ-butyrolactone and methyl formate.

The electrolyte salt used in the systems of this invention should be compatible with the solvent and both the silver or copper thiocyanate cathode and the anode used in the particular system adopted. Usually the anion of the salt solute should match the anion of the cathode but this should not be construed as a limiting factor. The solute salt should also be sufficiently soluble in the electrolyte solvent to assure a workable conductivity ($>10^{-3}$ ohm$^{-1}$ cm.$^{-1}$) at reasonable concentrations (e.g., $>¼$ molal).

Exemplary of some electrolyte salt systems are potassium thiocyanate (KSCN), lithium thiocyanate (LiSCN), sodium thiocyanate (NaSCN), lithium perchlorate (LiClO$_4$), aluminum chloride (AlCl$_3$), or the like and mixtures thereof.

In some instances the anode used in the systems of the present invention becomes covered with a black film formed on the surface which appears to have reduced the efficiency of the cell. This was particularly noted in the case of calcium anodes. The expedient used to eliminate this problem was the addition of a solid nonaqueous Lewis acid to the electrolyte, such as AlCl$_3$, or the like, which may also function as an electrolyte salt. Obviously, such Lewis acid electrode cleaning substances are chosen so as to avoid any deleterious or competing effects within the cell. They may be present in varying amounts.

The structure of the primary cells of this invention are conventional and include a case or electrolyte container, a cathode and anode disposed within the case or chamber for containing the electrolyte, suitable terminal and cover arrangements, and in some instances a membrane disposed between the electrodes. Obviously, the case should be made of materials resistant to the electrolyte system and electrode products. Precautions should be taken to provide a structure which will minimize human contact with solvent or solvent vapors where this is indicated, such as with the nitroamines.

The half cell reactions of typical primary cells of this invention are as follows:

At the cathode: $Ag^+ + e^- \rightarrow Ag^\circ$
At the anode: $Li^\circ \rightarrow Li^+ + e^-$ Obviously, such a system as described above permits recovery of the elemental silver formed at the cathode and where the silver thiocyanate is impressed on a support or matrix of silver the entire cathode element is recoverable. A similar result would follow applying the same convention to a copper thiocyanate cathode.

For a more complete understanding of this invention reference is made to the following specific examples of primary cells prepared in accordance with the precepts outlined herein.

EXAMPLE I

An electrochemical cell was assembled using a calcium anode (unsupported) of approximately one square centimeter in area. The cathode was solid silver thiocyanate cold pressed (using a paper pulp binder) on a silver matrix. The cathode area was also about 1 cm.$^2$. The electrolyte system comprised 30 ml. of 1 molal potassium thiocyanate in acetonitrile. The electrolyte had a specific conductivity at 33° C. of $10^{-2}$ ohm$^{-1}$ cm.$^{-1}$. The performance of the system (at about 25° C.) is shown in the following table:

TABLE I

| Time (minutes) | Current (ma.) | Cell voltage | Anode voltage | Cathode voltage |
|---|---|---|---|---|
| 0 | 0 | 1.15 V | −1.0 V | +0.15 V |
| 5 | 2 | 0.88 | −0.87 | +0.01 |

EXAMPLE II

A primary cell similar to that of Example I was assembled using LiSCN (1 molal) as the electrolyte. This electrolyte had a specific conductivity at 30° C. of $8.3 \times 10^{-3}$ ohm$^{-1}$ cm.$^{-1}$. The following results were obtained:

TABLE II

| Time (minutes) | Current (ma.) | Cell voltage | Anode voltage | Cathode voltage |
|---|---|---|---|---|
| 0 | 0 | 1.93 V | −1.82 V | +0.11 V |
| 10 | 2 | 1.74 | | |
| 26 | 5 | 1.50 | | |
| 65 | 10 | 1.15 | | |
| 65 | 0 | 1.8 | | |

EXAMPLE III

The ca/AgSCN cells of Examples I and II showed the deposition of a black film on the calcium anode in the first 5 minutes of operation which reduced the efficiency of the cell. A Lewis acid was incorporated as an electrode cleaner and to improve efficiency. This example is the same as Example I except that the electrolyte is ½ molal AlCl$_3$-½ molal KSCN in acetonitrile. The following results at various loads were obtained:

TABLE III

| Time (minutes) | Current (ma.) | Cell voltage | Anode voltage | Cathode voltage |
|---|---|---|---|---|
| 0 | 0 | 2.5 V | −2.45 V | 0.0 V |
| 10 | 2 | 2.1 | −2.35 | −0.25 |
| 10 | 5 | 2.1 | −2.25 | −0.20 |
| 25 | 5 | 1.5 | −2.25 | −0.80 |
| 25 | 10 | 1.2 | −2.15 | −0.90 |
| 40 | 10 | 0.95 | −2.0 | −1.05 |
| 40 | [1] 0 | 2.1 | −2.4 | −0.30 |

[1] 3 min.

EXAMPLE IV

In this example the cell was modified to use a solid unsupported lithium anode having the same dimensions noted for Example I. Since lithium is unstable in acetonitrile the electrolyte solvent was changed to N-nitrosodimethylamine and the electrolyte solute lithium thiocyanate (LiSCN) (1 molal concentration). The electrolyte system had a specific conductivity at 25° C. of $5.2 \times 10^{-3}$ ohm$^{-1}$ cm.$^{-1}$. The results are shown in the following table:

TABLE IV

| Time (minutes) | Current (ma.) | Cell voltage | Anode voltage | Cathode voltage |
|---|---|---|---|---|
| 0 | 0 | 2.9 V | −2.7 V | +0.21 V |
| 10 | 2 | 2.6 | −2.45 | +0.07 |
| 10 | 5 | 2.2 | −2.3 | −0.12 |
| 22.5 | 5 | 2.15 | −2.4 | −0.23 |
| 22.5 | 10 | 0.8 | −2.0 | −1.2 |
| 25 | 10 | 1.4 | −2.05 | −0.8 |
| 57.5 | 10 | 1.6 | −2.05 | −0.35 |
| 57.5 | 0 | 2.8 | −2.6 | +0.10 |

EXAMPLE V

In a repeat of Example IV using a 10 ma. spontaneous discharge to determine coulombic efficiency which was 71.4% at 1.5 volts and 85% at the cutoff voltage of 0.9 volt, the energy efficiency at the average discharge voltage of 1.7 volts was 86 watt hours per pound of active materials. The summary of the data is as follows:

TABLE V

| Time (minutes) | Coulombs | Cell voltage | Anode voltage | Cathode voltage |
|---|---|---|---|---|
| 0 | ([1]) | 2.85 | −2.65 | +0.22 |
| 0 | 0 | 1.75 | −2.0 | −0.04 |
| 270 | 162 | 1.5 | −2.2 | −0.65 |
| 315 | 189 | 0.9 | −2.2 | −1.2 |
| 325 | [2] 189 | 2.65 | −2.7 | −.04 |

[1] Open circuit.
[2] Open circuit.

EXAMPLE VI

To illustrate the low temperature performance Example V was repeated at 0° C. With a constant load of 10 ma. the anode exhibited 0.1–0.2 volt polarization from the room temperature (24° C.) value and the cathode performance was about the same as shown in the following table:

TABLE VI

[The low temperature run approximately 0° C. and 10 ma.]

| Time (minutes) | Temp., ° C. | Coulombs | Cell voltage | Anode voltage | Cathode voltage |
|---|---|---|---|---|---|
| 0 | | | 2.8V | | |
| 5 | 24 | 0 | 2.9 | −2.7 | 0.16 |
| 7.5 | 7 | 0 | 2.85 | −2.7 | 0.14 |
| 17.5 | 3 | 4.5 | 1.2 | −2.1 | −0.85 |
| 20 | 1 | 6 | 1.25 | −2.1 | −0.8 |
| 35 | 2 | 15 | 1.6 | −2.25 | −0.55 |
| 65 | 2 | 33 | 1.7 V | −2.2 V | −0.4 V |
| 72.5 | 5 | 37.5 | 1.85 | −2.25 | −0.42 |
| 135 | 17 | 75 | 1.9 | −2.3 | −0.415 |
| Open circuit | 17 | 75 | 2.7 | 2.7 | 0.01 |

This primary cell system showed a temperature coefficient of about 0.008 volt per ° C.

EXAMPLE VII

An electrochemical cell was prepared similar to the procedure followed in Example I using, however, a 1 cm.$^2$ cathode of copper thiocyanate (CuSCN) (on a copper grid) and a 1 cm.$^2$ lithium anode. The electrolyte was a 1 molal solution of lithium thiocyanate in nitrosodimethylamine. At 25° C. the cell had an open circuit voltage of 2.7 volts and, at a load of 5 milliamperes, a voltage of 1.8 volts after 15 minutes.

EXAMPLE VIII

A cell similar to Example I was prepared using an AgSCN cathode and a potassium anode pressed on a silver grid matrix for support. The electrolyte was LiClO$_4$ (1 molal) in nitrosodimethylamine. Both electrodes were 1 cm.² The cell voltages were:

| | Volts |
|---|---|
| Open circuit | 1.4 |
| 5 ma. load (15 minutes) | 0.3 |

EXAMPLE IX

A cell identical to Example VIII, except using a solid sodium anode, was prepared. The following results were obtained:

| | Cell voltages |
|---|---|
| Open circuit | 1.25 |
| 5 ma. load (10 minutes) | 1.0 |

The foregoing examples illustrate the various combinations of thiocyanate electrodes with alkali and alkaline earth metal anodes which can be used as primary cells. It should be also understood, however, that the foregoing examples are merely illustrative and that other combinations of the cathodes, anodes and electrolytes taught herein can be prepared with equally satisfactory results in the production of primary electrochemical batteries.

We claim:

1. A primary electrochemical cell comprising a solid cathode selected from the group consisting of silver thiocyanate and copper thiocyanate, a compatible non-aqueous electrolyte system comprising an electrolyte salt selected from the group consisting of alkali and alkaline earth metal thiocyanates or perchlorates, aluminum chloride, and mixtures thereof, and a nonaqueous organic solvent which is non-reactive with the electrode material and is fluid and mobile at operating temperatures and is a solvent for the electrolyte salt and a compatible anode selected from the group consisting of alkali and alkaline earth metals.

2. A primary cell according to claim 1 wherein the electrolyte system contains a thiocyanate electrolyte salt.

3. A primary cell according to claim 1 wherein the electrolyte solvent is selected from the group consisting of N-nitrosoamines of the formula

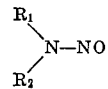

wherein $R_1$ and $R_2$ are independently selected from the group consisting of alkyl groups containing up to 4 carbon atoms.

4. A primary cell according to claim 1 wherein the anode is selected from the group consisting of lithium, calcium, sodium, potassium and magnesium.

5. A primary cell according to claim 1 wherein the cathode is solid silver thiocyanate.

6. A primary cell according to claim 1 wherein the cathode is solid copper thiocyanate.

7. A primary cell according to claim 1 wherein the anode is calcium.

8. A primary cell according to claim 1 wherein the anode is lithium.

9. A primary cell according to claim 1 wherein the anode is sodium.

10. A primary electrochemical cell consisting essentially of a solid silver thiocyanate cathode, a solid lithium anode and an electrolyte of an N-nitrosodimethylamine solution of lithium thiocyanate.

References Cited

UNITED STATES PATENTS

| 2,937,219 | 5/1960 | Minnick et al. | 136—6 |
| 3,098,770 | 7/1963 | Horowitz et al. | 136—100 |
| 3,132,054 | 5/1964 | Carson | 136—137 |

ALLEN B. CURTIS, *Primary Examiner.*

A. SKAPARS, *Assistant Examiner.*

U.S. Cl. X.R.

136—100